US008250022B1

(12) United States Patent
Rubin

(10) Patent No.: US 8,250,022 B1
(45) Date of Patent: Aug. 21, 2012

(54) TYPE 5 KNOWLEDGE AMPLIFICATION BY STRUCTURED EXPERT RANDOMIZATION (KASER)

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 430 days.

(21) Appl. No.: 12/652,215

(22) Filed: Jan. 5, 2010

(51) Int. Cl.
G06F 17/00 (2006.01)
G06N 5/04 (2006.01)

(52) U.S. Cl. .......................................................... 706/60
(58) Field of Classification Search ...................... 706/60
See application file for complete search history.

(56) References Cited

U.S. PATENT DOCUMENTS 7,047,226 B2   5/2006   Rubin

OTHER PUBLICATIONS

'KASER: Knowledge amplification by structured expert randomization': Rubin, 2004, IEEE, transactions on systems, man, and cybernetics, vol. 34, No. 6.*
'Modeling human cognition using a transformational knowledge architecture': Rubin, 2008, IEEE, 978-1-4244-2173.*
KASER: A qualitatively fuzzy object oriented inference engine: Rubin, 2002, IEEE 0-7803-7461.*
'Application of object oriented design to knowledge amplification by structured expert randomization (KASER)': Rubin, 2002, IEEE, 0-7695-1576-2.*
'A system of systems (SoS) design amplifier': Rubin, 2005, IEEE, 0-7695-2495-8.*
Escardo, M., "Complexity considerations for hash tables", Jan. 12, 2006, online: "http://www.cs.bham.ac.uk/~mhe/foundations2/node92.html" taken Dec. 15, 2008.
Rubin, S., et al., "Learning Using an Information Fusion Approach", Proc. of the ISCA Int'l Conference on Intelligent and Adaptive Systems, Nice, 2004.
Chaitin, G.J., "Randomness and Mathematical Proof", Sci. Amer., vol. 232, No. 5, pp. 47-52, 1975.
Zadeh, L.A., "From Computing with Nos. To Computing with Words . . . ," IEEE Trans. Ckt. and Systems, vol. 46, No. 1, pp. 105-119, 1999.
Rubin, S.H., et al., "On the Role of Informed Search in Veristic Computing", Proc. 2001 IEEE Int. Conf. Syst., Man, Cybern., pp. 2301-2308, 2001.

(Continued)

Primary Examiner — Kakali Chaki
Assistant Examiner — Peter Coughlan
(74) Attorney, Agent, or Firm — Kyle Eppele; J. Eric Anderson

(57) ABSTRACT

A new production generation method comprising: a.) storing a list of productions on a memory store on a computer, wherein each production comprises a context and a consequent, each context and consequent comprising at least one feature; b.) searching the production list for productions with contexts that match a user-provided context; and c.) if no context-matching production is found, i.) randomly selecting a sub-set of features from the user-provided context, ii.) selecting from the production list by uniform chance a first production with a context that matches the selected feature sub-set, iii.) substituting the feature or feature sub-set with the consequent of the first production to create a first feature set, iv.) replacing features in the first feature set as specified by predefined rules to create a new feature set, and v.) displaying a new production consisting of the user-provided context and the new feature set.

13 Claims, 2 Drawing Sheets

OTHER PUBLICATIONS

Rubin, S.H., et al., "KASER: Knowledge Amplification by Structured Expert Randomization", IEEE Trans. Syst., Man, Cybern.: Part B, vol. 34, No. 6m Dec. 2004, pp. 2317-2329.

Rubin, S.H., "On randomization and discovery", Information Sciences, vol. 177, pp. 170-191, Jan. 2007.

Rubin, S.H., "Graphic User Interface having Menus for Display of Context and Syntax Useful in an Artificial Intelligence System" Unpublished U.S. Appl. No. 12/390,642, filed Feb. 23, 2009.

Rubin, S.H., "System and Method for Type 2 KASER (Knowledge Amplification by Structured Expert Randomization)", Unpublished U.S. Appl. No. 12/390,633, filed Feb. 23, 2009.

Rubin, S.H., "Type 4 Kaser (Knowledge Amplification by Structured Expert Randomization) Providing Case-Based Inductive and Analogical Reasoning)", Unpublished U.S. Appl. No. 12/430,224, filed Apr. 27, 2009.

Rubin, S.H., "System and Method for Manipulating Database Search Results", Unpublished U.S. Appl. No. 12/552,506, filed Sep. 2, 2009.

* cited by examiner

TYPE 5 KNOWLEDGE AMPLIFICATION BY STRUCTURED EXPERT RANDOMIZATION (KASER)

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil. Reference Navy Case Number 99820.

BACKGROUND OF THE INVENTION

This disclosure relates generally to expert systems for deriving possibilities and conclusions, in which a case based decision structure is used for deriving proposed conclusions.

SUMMARY

A computer may be used to generate new productions at runtime by performing the following steps: a.) storing a list of productions on at least one memory store on the computer, wherein each production comprises a context and a consequent such that (the context)→(the consequent), and wherein the context and consequent each comprise at least one feature; b.) searching the production list for productions with contexts that match a user-provided context; and c.) if no context-matching production is found, performing the following sub-steps: i.) randomly selecting a feature or a sub-set of features from the user-provided context, ii.) selecting from the production list by uniform chance a first production with a context that matches the selected feature or feature sub-set, iii.) substituting the feature or feature sub-set with the consequent of the first production to create a first feature set, iv.) replacing features in the first feature set as specified by predefined rules to create a new feature set, and v.) displaying a new production with a context that matches the user-provided context and a consequent consisting of the same features as the new feature set.

In another embodiment, a system of computers may be used to generate new productions from stored lists of productions, each production having a context and a consequent. In this embodiment, the system comprises: a central computer; a plurality of distributed processors communicatively coupled to the central computer, wherein each of the distributed processors is a domain-specific subsystem, configured to maintain a local contiguous list of productions respectively hierarchically ordered in non-increasing validity; and wherein the central computer is configured to coordinate the activities of the distributed processors to generate the new production when a new context is entered by a user, wherein each distributed processor is configured to expand and contract the user-provided context to create a new consequent that corresponds with the user-provided context.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
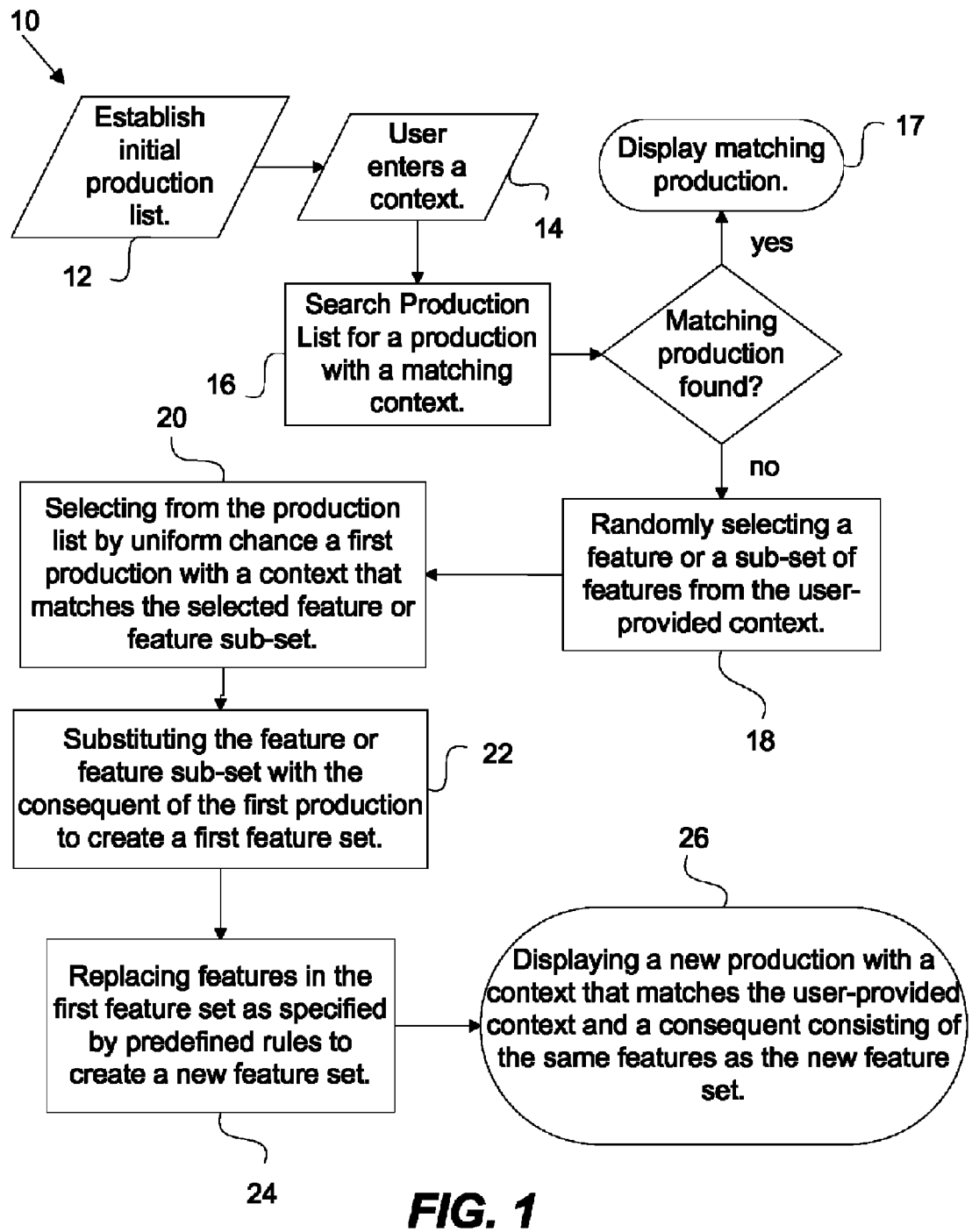
FIG. 1 is a flowchart depicting the T5K method.

FIG. 1 is a flowchart illustrating a Type 5 Knowledge Amplification by Structured Expert Randomization (T5K) system and method 10 for using a computer to generate new productions at runtime. The first step 12 of the T5K method 10 provides for storing a list of productions—or a rule base—on at least one memory store on the computer. Each production comprises a context and a consequent such that (the context)→(the consequent). Each context and each consequent comprise at least one feature. In the next step 14, a user enters a context. Step 16 provides for searching the production list for productions with contexts that match the user-provided context. If a production with a matching context is found, step 17 provides for displaying the production with the matching context. If multiple productions are found with matching contexts, the production with the longest consequent is displayed. If no context-matching production is found, the T5K method 10 performs the sub-steps 18-26. Step 18 provides for randomly selecting a feature or a sub-set of features from the user-provided context. Step 20 provides for selecting from the production list by uniform chance a first production with a context that matches the selected feature or feature sub-set. Step 22 provides for substituting the feature or feature sub-set with the consequent of the first production to create a first feature set. Step 24 provides for replacing features in the first feature set as specified by predefined rules to create a new feature set. Step 26 provides for displaying a new production with a context that matches the user-provided context and a consequent consisting of the same features as the new feature set.

The T5K method 10 can be illustrated with the following example. Let: b$\updownarrow$=barometer rising/falling; c=cloudy; f=freezing; w=warm; p=precipitation; r=rain; s=snow; cl=clear. Assume in this example that the initial production list contains the following productions (Si):

S1: b$\downarrow$c→p
S2: p f→s
S3: p w→r
S4: b$\uparrow$c→cl
S5: b$\downarrow$b$\uparrow$→∅; Also, note that b$\downarrow$ b$\downarrow$ is not a proper set.

The Si may not march time; rather, they are to be viewed as equivalence transformations. This requirement is always satisfied by contracting transformations because they are guaranteed to be acyclic. Productions may be manually and/or automatically acquired. Now, continuing with the example, if a user enters the context, b$\downarrow$cl the T5K method 10 will first search the production list for a production with a matching context. In this case, however, there are no productions in the production list with a context of b$\downarrow$cl. At this point, the T5K will randomly select a set of features, or feature, from the user-provided context, b$\downarrow$cl. Assume that the system chooses the feature "cl." Then, based on the production S4 from the production list above, the context is expanded wherein "cl" is replaced with "b$\uparrow$c" to yield "b$\downarrow$b$\uparrow$c." Since the features "b$\downarrow$ b$\uparrow$" cancel each other out according to the rule at S5, the feature set is contracted and we are left with the feature "c." In other words, b$\downarrow$cl→b$\downarrow$b$\uparrow$→NIL c→c. Thus, in this highly simplified example, the T5K method 10 was able to generate the prediction that when it is clear and the barometer is falling the result will be a cloudy condition. This production would then be displayed to the user to verify or to correct.

Here are two more examples of T5K operations using the production list presented above: (1) b$\uparrow$r→ ... →c w; and (2) b$\uparrow$s→ ... →c f. Such transformations are non-deterministic, since in general there can be more than one substitution for any consequent. State vector transformations that appear to yield incorrect results are automatically corrected in the second step of hashing them to an action sequence. New productions/transforms are inserted at the logical head of the production list and moved there upon reference if correct (see below). Explanations of how the T5K method 10 came up with any given production may be shown to the user as a simple derivational trace.

Implementation of the T5K method 10 does not require a GUI and thus may be realized in Xanlysis Common Lisp or Java—so long as the language has array and excellent hashing facilities. Java or equivalent may be used for the implementation. Arrays may be used with indirection for the links.

The initial productions for randomization are not created at runtime in view of the impossibility of knowing what to create, but must already be present in the initial production list. For example, if the production list holds b↓c→p and the user enters, b↓c f→s, then a randomization is p→s. If the context hashes to a production, then it is fired. Otherwise, an ambiguous complex search involving contractions and expansions may ensue, where each intermediate state is hashed as before. Alternative branches may be chosen by uniform chance in parallel processors. Given a relatively large space of non-deterministic transforms being processed in parallel, it is acceptable for cyclic behavior to be allowed. Such behavior is defined by repetition in a contextual state.

Procedural actions may or may not modify the context and may or may not produce output—including the generation of questions—so long as the action sequence is not NIL. Often, the context is directly (e.g., see what follows) and/or indirectly (e.g., turning the head of a robot) modified by the firing of associated consequents. The reserved "+" and "−" signs are used to automatically modify the context in conjunction with a fired production, using the exact word(s) or phrase(s) that follow (corrected for spelling and possibly grammar), hashed to unique integers to save space, and delimited by commas. Consequents prefixed by a "+" will augment the context, if not already so augmented. Similarly, such consequents prefixed by a "−" will erase from the context the syntactically matching predicate, if present. Only such prefaced consequents may automatically modify the context on the next iteration of the inference engine. This process of insertion and erasure effects truth maintenance operations (i.e., iteratively retracting or replacing assertions and conclusions that are no longer valid as a result of production actions). The authoring of syntactically proper non-monotonic rules requires that the user be given visual access to the most-recent context. A single consequent may specify an arbitrary number of "+" and "−" actions, which will be executed in sequential order from left to right. The context may not contain duplicate integers, since it is a set.

For example, a contextual set placed in numerical order using Quicksort, for example, to facilitate search operations, which utilizes bisection search, might be, {1, 34, 35, 41, 897}. Next, a fired production action might be, −41, which will change the context to, {1, 34, 35, 897}, where unique integers are hashed to an ascribed semantics and vice versa. It is permissible to attempt to erase an integer not present. This will simply result in an identity operation. The use of the "+" sign is similar (see below).

A simple optimization is also performed as follows prior to saving a new non-monotonic rule. Scanning from left to right, advance the pointer by one to the right until the end is reached. Note that in what appears next, the word, followed, allows for non-contiguous following.

a. If +# is not followed by −#, then keep the +# and advance the pointer.
b. If +# is followed by −#, then delete the +# and advance the pointer.
c. If +# is followed by +#, then delete the left +# and advance the pointer.
d. If −# is not followed by +#, then keep the −# and advance the pointer.
e. If −# is followed by +#, then delete the −# and advance the pointer.
f. If −# is followed by −#, then delete the left −# and advance the pointer.

For example, let the context be {2, 3, 5}. Let, the user specify the initial non-monotonic command sequence: +3, +3, −3, +3, +3, −3, −3. The result of applying this sequence to the context is the set, {2, 5}. Applying (b) to the initial non-monotonic command sequence yields, +3, −3, +3, +3, −3, −3. Next, applying (b) again yields, −3, +3, +3, −3, −3. Next, applying (e) yields, +3, +3, −3, −3. Next, applying (c) yields, +3, −3, −3. Next, applying (b) yields, −3, −3. Finally, applying (f) yields, −3. This then is the desired optimization. It immediately replaces the initial non-monotonic command sequence in the saved production.

Features may be ascribed a probability (e.g., 0.75 "cloudy"). Consequents may also be ascribed a probability (e.g., 1.0 ("take_cell-phone" and (0.6 "take_raincoat" or 0.4 "take coat")). In this example, the user (or function) must ascribe a probability of at least 0.75 that it is cloudy for cloudy to be included in the context as a feature. Of course, the feature, 1.0 "mostly cloudy" would be another equivalent way to represent this information (i.e., through the actions of non-monotonic rules). Equivalence transformations will be effected by way of computational analogy (see below). In this example, one always takes ones cell-phone and usually also takes a raincoat or less frequently a coat in lieu (the ascribed disjunctive probabilities must sum to unity for each disjunctive set). The system will automatically normalize supplied disjunctive probabilities so as to sum to unity. For example, a supplied (0.75 "take raincoat" or 0.50 "take coat") becomes (0.6 "take raincoat" or 0.4 "take coat") after normalization (i.e., multiplying the supplied disjunctive probabilities by 1/their sum). The applicable procedures are chosen probabilistically using a uniform random number generator. All probabilities are 1.0 (i.e., 100 percent) by default. They are never propagated up through the productions and may only be set by the user (or alternatively by a domain-specific subsystem).

Probabilities may be convolved and de-convolved as necessary using a table lookup. For example, 0.75 "cloudy" may be convolved into "mostly cloudy", "overcast", etc., or de-convolved into numeric form. The relation between the numeric and qualitative forms is one to many, which allows for non determinism in the selective process.

Stochastic grammars are permissible and may be illustrated as follows. Let, h=hail. Then, S3': p w→{0.95 r, 0.05 h}. The sum of disjunctive probabilities in the brackets must be unity. Suppose the context is, cl h→b↑c p w→b↑b↓c c w→c w. In other words, hailing from a clear sky is equivalently cloudy and warm. The saved transformation is, cl h→c w. Similarly, raining from a clear sky is equivalently cloudy and warm, since cl r→b↑c p w→c w. This makes sense when you think of "sun-showers" though it need not. Only its mapped action sequence need be correct. Stochastic non determinism is also allowed in the specification of hashed rule consequents. The definition here is the same as for stochastic grammars.

If no state transformations are required to fire the action sequence, then the possibility is virtually 100 percent. Otherwise, the possibility is based on a dynamic tally of the likelihood of being correct based on previous experience, given a moving window, where the number of most-recent cases used may not exceed the number of transformations (e.g., zero cases for zero transformations). Interpolation may be employed.

The central concept is to employ statistical mechanics to the learning mechanism. As a result, concepts may be forgotten, the same training may need to be iterated over time, and analogies will be produced.

Starting with a contextual state, as before, transforms are applied at chance to allow for expansions and contractions. These transforms are acquired state transforms, or productions, which are applied left to right or vice versa. A final pass iteratively applies the most-specific strictly contracting transforms to conclusion.

Conflict resolution among applicable productions, in either direction, is made by uniform chance. A massively parallel solution is eminently practical. The T5K method 10 may be run simultaneously on parallel processors, each processor having its own unique production list covering a unique knowledge domain. A major benefit of this methodology is that it is capable of keeping an almost indefinite number of parallel processors busy until a solution, if any, is found.

Figure 2:
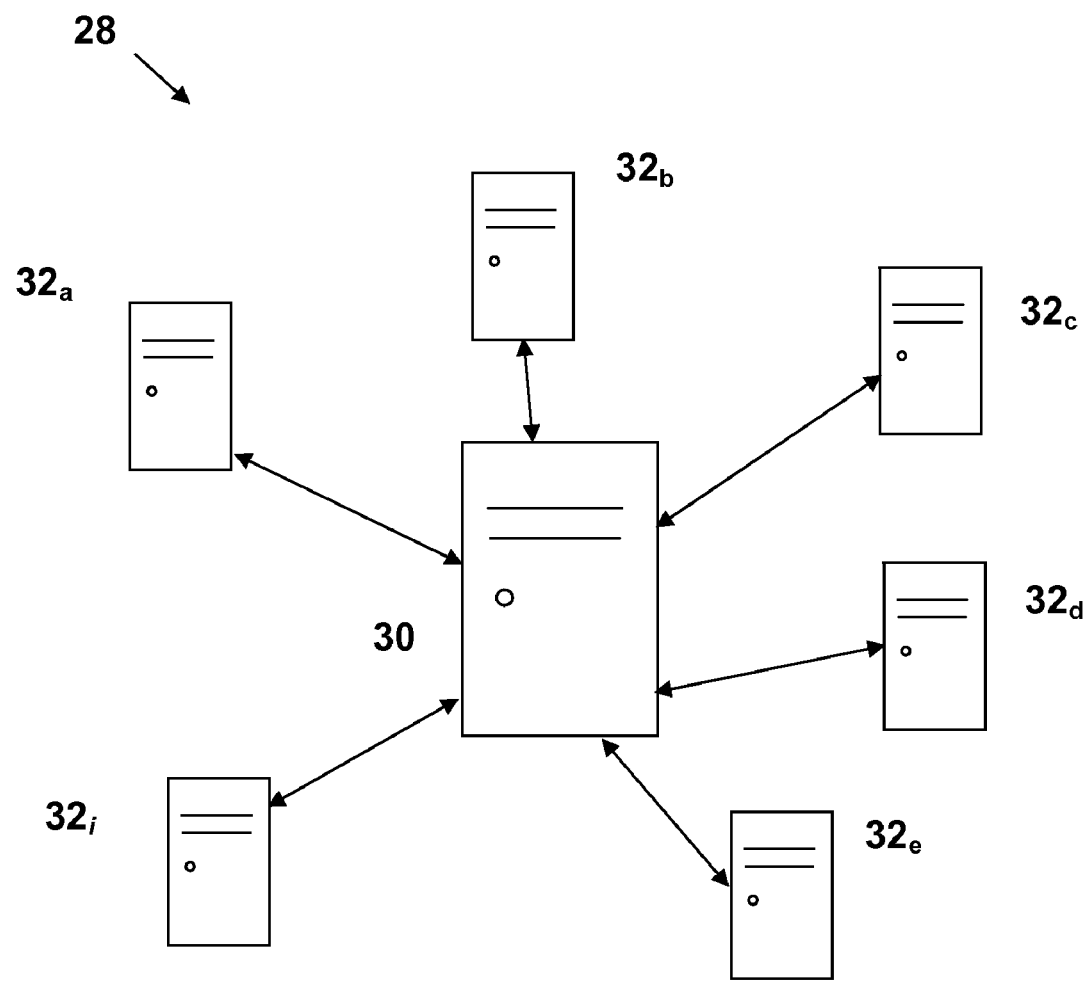
FIG. 2 is an illustration showing a T5K system.

FIG. 2 shows how, in one embodiment, the T5K method 10 may be implemented on a system of computers 28 comprising a central computer 30 and a plurality of distributed processors 32$_{a\text{-}i}$. Each of the distributed processors 32$_{a\text{-}i}$ is communicatively coupled to the central computer 30, and each is a domain-specific subsystem, configured to maintain a local contiguous list of productions respectively hierarchically ordered in non-increasing validity. In this embodiment, the central computer 30 is configured to coordinate the activities of the distributed processors 32$_{a\text{-}i}$ to generate the new production when a new context is entered by a user, wherein each distributed processor 32$_{a\text{-}i}$ is configured to expand and contract the user-provided context to create a new consequent that corresponds with the user-provided context. Once a distributed processor 32, has created a new production the given distributed processor 32, communicates the new production to the central computer 30.

When the central computer 30 receives new productions from multiple parallel processors 32$_{a\text{-}i}$, the central computer 30 selects the new production with the shortest consequent to display to a user. Ties are resolved in favor of the new production having the shortest length of acyclic derivation.

The resulting state vectors are non-redundantly stored in a set. Each resulting state vector serves as the context for the next one and is hashed to possibly produce a previously acquired procedural consequent.

Each (intermediary) resulting state vector, in each processor, is hashed (i.e., see associative memory below) until a non-NIL consequent is obtained, a timer interrupt is generated, or the number of state vectors in this set attains its limiting size.

The fired consequent will be the one paired with the most-specific (i.e., longest) state vector or subset thereof produced, if any.

In the case of a tie due to multiple most-specific state vectors, the list of candidate procedural consequents is resolved in favor of the production nearest the head of its processor list and otherwise at chance.

Whenever feedback supplies the correct (existing) procedural consequent, each produced NIL consequent, if any, is set to the correct one. As a result, analogous state vectors may produce the same consequent result. Also, training on distinct contexts will transfer over to analogous contexts because of its effect on the principle of majority voting.

Feedback need not always be immediate. Indirect feedback may occur in a game of chess for example and is ubiquitous in a networked system of systems architecture. A System of Systems (SoS) is consistent with the evolutionary development of ever-greater complexity. That is, fired consequents can influence contexts in all sub-systems. Here, each production is assigned a counter, which is incremented every time it is fired and reset to zero upon the receipt of positive or negative feedback. Then, upon the receipt of positive feedback those productions having the greatest frequency count and not tagged to be moved to the logical tail are moved to the logical list head (i.e., highest position), where ties maintain the previous relative ordering (i.e., stable). Similarly, the receipt of negative feedback results in the logical movement of those productions having the greatest frequency count and not tagged to be moved to the logical head to the logical list tail (i.e., lowest position), where ties again are stable. Whenever a production is moved to the logical list head or tail, it is tagged as such. Subsequent movement to the logical list tail or head respectively will remove that tag. If a production tagged "head" is again so tagged, it is logically moved to the first position instead. If a production tagged "tail" is again so tagged, it is expunged instead (i.e., forgotten).

When necessary, memory may be reclaimed from the tail of the local processor list(s), since overwriting here is least likely to induce the loss of quality knowledge. The Least-Frequently Used (LFU) productions and state vector transformations are expunged to free space. The tail production may be expunged from the logical tail of the production list when necessary to reclaim storage space so long as the tail production is not the sole definition for a non-terminal symbol.

If the produced consequent is corrected, then all produced state vectors that are equivalently minimally longer than the one paired with the produced consequent are set to the correct consequent. Thus, the minimally more specific antecedent(s) will likely fire before the erroneous one will, while preserving said erroneous one for situations where it was correctly fired.

If no more specific antecedent(s) exist, then the erroneously fired antecedent(s) are paired with the correct consequent. However, if this antecedent is more specific than the erroneously fired one, then it will be paired with the correct consequent instead. Observe that this methodology will result in the need for repeated training and allows for the statistical loss of previously acquired knowledge.

Hashing emulates associative memory and insures that the overall system will be scalable. Hashing not only allows for the fastest possible rule retrieval mechanism, but plays a similar role in state vector transformations. Here, randomly selected contexts, or most-specific contexts in the final pass, are hashed to see if a (contracting) state transform is known and can thus be applied.

Sequences of words may be assigned a unique integer id. These sequences are not internally randomized so as to enable speed of processing over spatial reduction. The user pairs such resultant ids with each resulting pseudo-minimal feature set for an action production. For example, S6: {c, w}→1, where say, 1←(a nice day).

Next, suppose that the resulting feature set were, {r}. Assuming that no exact matches can be had, it is expanded by chance by applying the inverse of S3: r→pw. Assuming that no most-specific match can be had for {p, w}, it is expanded by chance by applying the inverse of S1: p→b↓c. This yields, {b↓, c, w}. Now, S6 may be selected as the most-specific match and applied to yield, {b↓, 1}. This is found to be a pseudo-minimal augmented feature set. Assuming that no further matches can be had, the user supplies the consequent for the correct action production, say, S7: {b↓, 1} 2, where 2←(a rainy day). Notice that elements on the Left-Hand-Side (LHS), or context, are treated as sets. Note too that {cl, w}→1. Thus, the same prediction will be issued by S7 and therein is the generality of the method. But, were this prediction deemed to be incorrect, then the correction might appear, S8: {b↓, cl, w}→3, where 3←(a cloudy day). Here, notice that {cl, w} may not imply 1 because then {b↓, cl, w}→{b↓, 1}→2, which would imply a rainy instead of a cloudy day here. The solution is to match the most-specific match before any lesser one. Resolve ties in favor of the topmost (i.e., most-recently applied and moved to the logical head) most-specific match. Thus, {b↓, cl, w}→3, while {cl, w}→1 (i.e., the fall-through less-specific one).

In translating a procedural sequence (e.g., sequence of words) into a feature set specification, the previous step is run in the reverse direction. For example, "a cloudy day, a rainy day" has a most-specific reduction to (3, 2). Again, resolve ties in favor of the topmost (i.e., most-recently applied and moved to the logical head) most-specific match. Each supplied phrase must define a unique integer, which means that it must be defined by a feature-set reduction. All unknown phrases must be so defined and reduced before proceeding. Our result thus far reduces to {b↓, cl, w}∪{b↓, 1}={b↓, cl, w, 1}={b↓, cl, w, {cl, w}}={b↓, cl, w}. By definition, this reduction will always be correct. Notice that {b↓, cl, w}→3 in the previous step and (3, 2)→{b↓, cl, w} here. This is because the translation of natural language is ambiguous, while its generation is deterministic.

In a practical sense, the number of requisite characteristic functions is minimized through their parametization. This is equivalent to creating frames in a case-based reasoning system, which provides for better analog explanations than rule chains. For example, instead of say two distinct functions such as, "Pawn attacks Rook" and "Knight attacks Bishop", one would preferentially use, "Attacks (piece1, piece2)". In theory, an n-ary set of arguments is equivalent to a monadic argument; but, in practice one wants to maximize the number of arguments to facilitate customization of the response. In particular, if the formal parameter is "possibility", then it is defined to be a possibilistic textual var parameter. For example, "Attacks (piece1, piece2, possibility)", where possibility might be written back in numeric form or as, "likely", "unlikely", or so on for convolution/de-convolution using table lookups. Thus, state functions need not always return simple Boolean states—they can be qualitatively fuzzy too (i.e., CW).

Rule consequents take the schema, "(text) (arg1) (text) (arg2) . . . ", where argi is of the form, function.parametric_instance. For example, "The Knight will take the Bishop." Here, Attacks.arg1="Knight" and Attacks.arg2="Bishop". Functions and their parametric instance pairings are presented as a list for the user to use in writing consequents. Thus, when the user say wants to specify "Knight", they specify "Attacks.arg1", where this formal parameter is instantiated at runtime with the actual parameter.

If Wernicke's area is damaged in the non-dominant hemisphere of the human brain, speech is preserved, but language content will be incorrect. For example, such a patient might utter, "I called my mother on the television and did not understand the door" (see http://en.wikipedia.org/wiki/Receptive_aphasia). The correct utterance would have been, "I called my mother on the telephone". Similarly, the instantiation of a consequent schema may require post-transformation to refine it. In the above example, it might be preferable to state, "Take the Bishop with your Knight."

A Type 0 grammar is acquired, which is defined by such productions as: The Knight will likely take the Bishop→It is best to take the Bishop with your Knight In a strictly procedural system (e.g., for creative industrial control), the use of text is not warranted. Here, such transformations may be properly viewed as optimizations (e.g., substituting a Quick Sort procedure for Insertion Sort, where n>21). The transformations are applied prior to presentation to the user. The most-specific (i.e., longest) transformations are iteratively applied to conclusion such that a cycle is not induced. Transformations that would induce a cycle if applied (i.e., a repetition in a result) are skipped. Such redundancy can be rapidly discovered through the use of hashing (associative memory).

The allowance for stochastic non determinism, parametric instantiations to predict, and a Type 0 grammar to correct insures that consequents will be dynamic and creative, which is not the case for traditional expert systems. Here is how the user will correct a perceived erroneous consequent (presented action sequence):

a. L1: If the post grammatically transformed consequent is deemed correct, no action is taken and exit.

b. If the post grammatically transformed consequent is deemed incorrect, present the pre grammatically transformed consequent and ask the user if correct if not validated in the previous iteration.

c. If the pre grammatically transformed consequent is deemed correct, request the user to supply the correct post grammatically transformed consequent and acquire the Type 0 corrective grammatical production, previous result of grammatical transformation→supplied desired result of grammatical transformation. Next, apply the Type 0 corrective grammar, then go to L1. (Note that the actions of the grammar may or may not conclude with the desired production.)

d. If the pre grammatically transformed consequent is deemed incorrect, request the user to supply the correct pre grammatically transformed consequent and acquire as described above. Next, apply the Type 0 corrective grammar, then go to L1.

Notice that correct derivations are symmetric (i.e., analogs), but corrections are random. State and grammatical transformations alike should be preferentially acquired as numerous, more-general rules, rather than as a single most-specific rule, where valid. This facilitates reuse.

From the above description of the T5K, it is manifest that various techniques may be used for implementing the concepts of the method without departing from its scope. The described embodiments are to be considered in all respects as illustrative and not restrictive. It should also be understood that the T5K is not limited to the particular embodiments described herein, but is capable of many embodiments without departing from the scope of the claims.

I claim:

1. A method for using a computer to generate new productions at runtime comprising the following steps:

a.) storing a list of productions on at least one memory store on the computer, wherein each production comprises a context and a consequent such that (the context)→(the consequent), and wherein the context and consequent each comprise at least one feature;

b.) searching the production list for productions with contexts that match a user-provided context, and if multiple context-matching productions are found: displaying the context-matching production having the longest consequent;

c.) if no context-matching production is found, i.) randomly selecting a feature or a sub-set of features from the user-provided context, ii.) selecting from the production list by uniform chance a first production with a context that matches the selected feature or feature sub-set, iii.) substituting the feature or feature sub-set with the consequent of the first production to create a first feature set, iv.) replacing features in the first feature by removing any duplicate features in the first feature set to create a second feature set, and removing features that negate each other from the second feature set to create a new feature set, and v.) displaying a new production with a context that matches the user-provided context and a consequent consisting of the same features as the new feature set;

d.) moving the new production to the logical head of the production list if the new production is verified by a user; and e.) expunging a tail production from the logical tail of the production list when necessary to reclaim storage space so long as the tail production is not the sole definition for a non-terminal symbol.

2. The method of claim 1, further comprising the step of displaying a derivational trace of how a new production was created when prompted for an explanation of the new production by the user.

3. The method of claim 2, further comprising the step of allowing the user to correct the new production and moving the corrected production to the logical head of the production list.

4. The method of claim 3, further comprising the step of allowing the user to assign probabilities to individual features.

5. The method of claim 4, further comprising the step of automatically normalizing disjunctive probabilities of the features in a given consequent by dividing the probability of each feature in the given consequent by the sum of the probabilities of the consequent features such that the new sum of the consequent features is unity.

6. The method of claim 1, wherein the steps (a-e) are run simultaneously on parallel processors, each processor having its own unique production list covering a unique knowledge domain.

7. The method of claim 6, further comprising receiving new productions from each of the parallel processors, and selecting the new production with the shortest consequent, wherein ties are resolved in favor of the production having the shortest length of acyclic derivation.

8. A system of computers for generating new productions from stored lists of productions, each production having a context and a consequent, the system comprising:

a central computer;

a plurality of distributed processors communicatively coupled to the central computer, wherein each of the distributed processors is a domain-specific subsystem, configured to maintain a local contiguous list of productions respectively hierarchically ordered in non-increasing validity;

wherein the central computer is configured to coordinate the activities of the distributed processors to generate the new production when a new context is entered by a user, wherein each distributed processor is configured to expand and contract the user-provided context to create a new consequent that corresponds with the user-provided context;

wherein each distributed processor is configured to create a new production by completing the following steps:

a.) storing a local list of productions on at least one memory store, wherein the context and consequent each comprise at least one feature;

b.) searching the local production list for productions with contexts that match the user-provided context;

c.) if no context-matching production is found, i.) randomly selecting a feature or a sub-set of features from the user-provided context, ii.) selecting from the local production list by uniform chance a first production with a context that matches the selected feature or feature sub-set, iii.) substituting the feature or feature sub-set with the consequent of the first production to create a first feature set, iv.) replacing features in the first feature set as specified by predefined rules to create a new feature set, and v.) outputting to the central computer a new production with a context that matches the user-provided context and a consequent consisting of the same features as the new feature set; and wherein the central computer is configured to receive new productions from each of the parallel processors, and to select the new production with the shortest consequent, wherein ties are resolved in favor of the new production having the shortest length of acyclic derivation.

9. The method of claim 8, further comprising the following step if in step (b) context-matching productions are found: displaying the context-matching production with the longest consequent.

10. The system of claim 9, wherein the central computer is configured to display a derivational trace of how a new production was created when prompted for an explanation of the new production by the user.

11. The system of claim 10, wherein the central computer is configured to allow the user to assign probabilities to individual features.

12. The system of claim 11, wherein the distributed processors are configured to automatically normalize any disjunctive probabilities of the features in a given consequent by dividing the probability of each feature in the given consequent by the sum of the probabilities of the consequent features such that the new sum of the consequent features is unity.

13. The system of claim 12, wherein the distributed processors are configured to remove any duplicate features in the first feature set to create a second feature set, and to remove features that negate each other from the second feature set to create the new feature set.

* * * * *